US012566844B2

(12) United States Patent
Tiwari et al.

(10) Patent No.:  US 12,566,844 B2
(45) Date of Patent:       Mar. 3, 2026

(54) SYSTEM AND METHOD FOR COLLABORATIVE SMART EVIDENCE GATHERING AND INVESTIGATION FOR INCIDENT RESPONSE, ATTACK SURFACE MANAGEMENT, AND FORENSICS IN A COMPUTING ENVIRONMENT

(71) Applicant: UNO.AI, INC., Palo Alto, CA (US)

(72) Inventors: Shashank Tiwari, Palo Alto, CA (US);
Murugesan Guruswamy, San Jose, CA
(US); Sahaj Tushar Gandhi,
Sunnyvale, CA (US); Sukhvir Singh,
San Jose, CA (US); Kaixin Huang,
Arcadia, CA (US)

(73) Assignee: UNO.AI, INC.

( * ) Notice: Subject to any disclaimer, the term of this
patent is extended or adjusted under 35
U.S.C. 154(b) by 196 days.

(21) Appl. No.: 18/498,076

(22) Filed: Oct. 31, 2023

(65) Prior Publication Data

US 2024/0143744 A1      May 2, 2024

Related U.S. Application Data

(60) Provisional application No. 63/421,000, filed on Oct.
31, 2022.

(51) Int. Cl.
*G06F 21/55*          (2013.01)
*G06F 21/54*          (2013.01)

(52) U.S. Cl.
CPC ............ *G06F 21/552* (2013.01); *G06F 21/54*
(2013.01); *G06F 21/554* (2013.01)

(58) Field of Classification Search
CPC ...... G06F 21/552; G06F 21/54; G06F 21/554;
G06F 21/566; G06F 21/577;
(Continued)

(56) References Cited

U.S. PATENT DOCUMENTS 10,862,905 B2    12/2020  Zettel, II et al.
10,951,662 B1     3/2021  Forte et al.
(Continued)

OTHER PUBLICATIONS

Splunk Enterprise Security 7.0.0 User and Administer Guide, Ver
7.0.0 Release date: Dec. 16, 2021 (Year: 2021).*
(Continued)

*Primary Examiner* — Wasika Nipa
*Assistant Examiner* — Edgar W Xie
(74) *Attorney, Agent, or Firm* — Jason C. Cameron

(57)              ABSTRACT
A system and method for collaborative smart evidence
gathering and investigation for incident response attack
surface management and forensics in a computing environ-
ment is disclosed. The system obtains evidence data from
multiple sources with various entry points, capturing con-
textual information. Further, the system processes the data
using an artificial intelligence (AI) root cause analysis, graph
augmented retrieval, semantic classifier, meaning extraction,
and causal discovery model. Furthermore, the system per-
forms similarity analysis to assess evidence quality, suffi-
ciency, and completeness. Based on the evaluation, the
system determines appropriate actions to be taken on the
processed evidence data. Additionally, the system executes
the actions to resolve the incidents effectively by using a
smart expert system, a human agent participation, or an AI
co-pilot, as a first-class investigator and collaborator in the
process.

18 Claims, 12 Drawing Sheets

(58) Field of Classification Search
CPC ........... G06F 2221/033; G06F 11/3698; H04L
63/1408; H04L 2463/146; H04L 63/1425
See application file for complete search history.

(56) References Cited

U.S. PATENT DOCUMENTS

| | | | |
|---|---|---|---|
| 11,012,466 B2 | 5/2021 | Gilmore et al. | |
| 2016/0140187 A1* | 5/2016 | Bae ....................... | G06F 40/211 |
| | | | 707/722 |
| 2018/0020021 A1 | 1/2018 | Gilmore et al. | |
| 2020/0329068 A1 | 10/2020 | Findlay | |
| 2022/0382856 A1* | 12/2022 | Yang ..................... | G06F 21/552 |
| 2024/0380802 A1* | 11/2024 | Gill .................. | G06Q 10/06311 |

OTHER PUBLICATIONS

Splunk Enterprise Security 7.0.0 Use Guide (accessed on Jan. 28, 2022) and Administer Guide (accessed on May 18, 2022) (Year: 2022).*

* cited by examiner

100

300B

322

Tag and categorize evidence

324

Extract attributes & features for similarity analysis

326

Find similar existing and possible evidence search parameters

328

Assess evidence quality based on intrinsic factors and extrinsic inputs

330

Determine type of required additional evidence to support investigation

300C

332  Select evidence to replay

334  Run underlying query or analysis to fetch the data set and its visual representation 336  Provide embedded preview if available 338  Navigate to the visual representation to study the evidence 340  Run additional queries and navigate to access the state before, during, and after the context when that evidence originally appeared

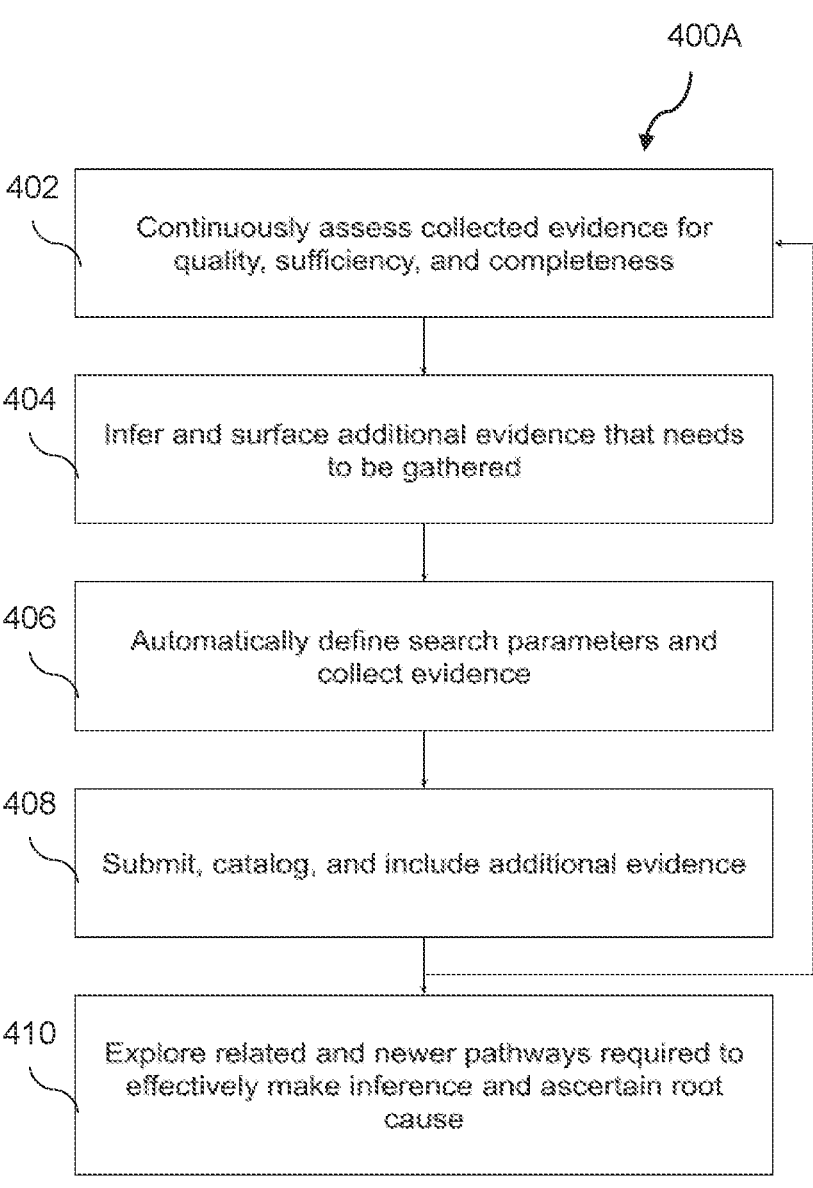

400A

402 — Continuously assess collected evidence for quality, sufficiency, and completeness 404 — Infer and surface additional evidence that needs to be gathered 406 — Automatically define search parameters and collect evidence 408 — Submit, catalog, and include additional evidence 410 — Explore related and newer pathways required to effectively make inference and ascertain root cause

FIG. 4A

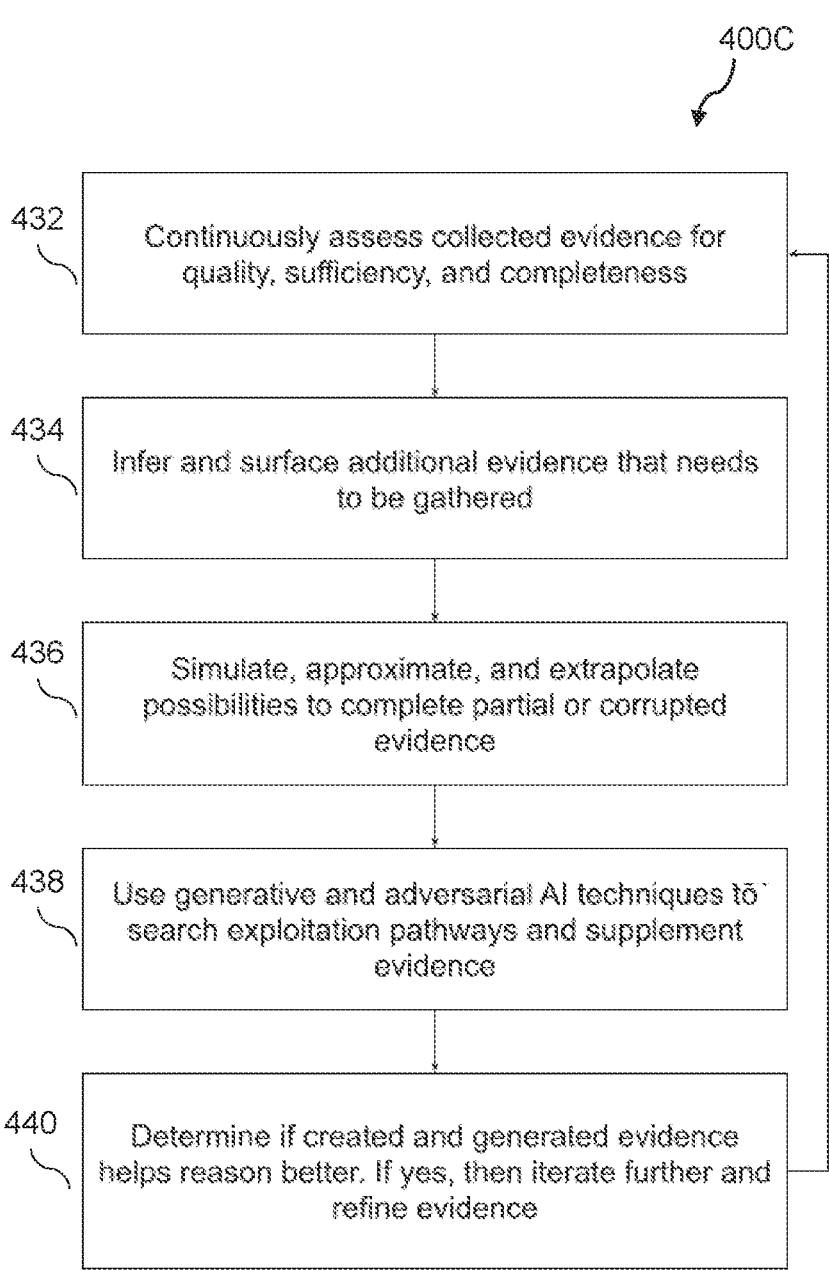

400C

432  Continuously assess collected evidence for quality, sufficiency, and completeness 434  Infer and surface additional evidence that needs to be gathered 436  Simulate, approximate, and extrapolate possibilities to complete partial or corrupted evidence 438  Use generative and adversarial AI techniques to search exploitation pathways and supplement evidence 440  Determine if created and generated evidence helps reason better. If yes, then iterate further and refine evidence

FIG. 4C

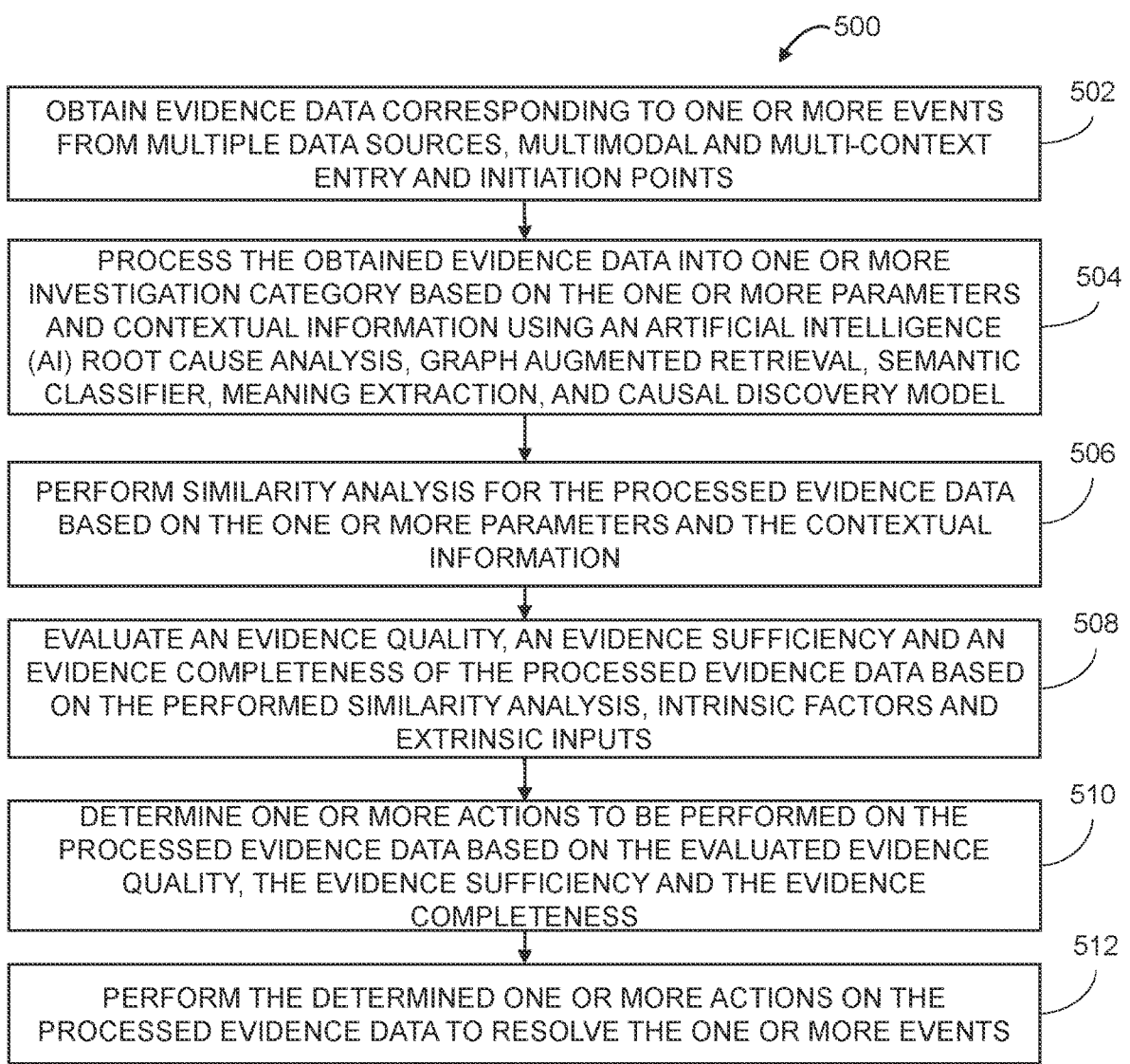

500

502
OBTAIN EVIDENCE DATA CORRESPONDING TO ONE OR MORE EVENTS FROM MULTIPLE DATA SOURCES, MULTIMODAL AND MULTI-CONTEXT ENTRY AND INITIATION POINTS

504
PROCESS THE OBTAINED EVIDENCE DATA INTO ONE OR MORE INVESTIGATION CATEGORY BASED ON THE ONE OR MORE PARAMETERS AND CONTEXTUAL INFORMATION USING AN ARTIFICIAL INTELLIGENCE (AI) ROOT CAUSE ANALYSIS, GRAPH AUGMENTED RETRIEVAL, SEMANTIC CLASSIFIER, MEANING EXTRACTION, AND CAUSAL DISCOVERY MODEL

506
PERFORM SIMILARITY ANALYSIS FOR THE PROCESSED EVIDENCE DATA BASED ON THE ONE OR MORE PARAMETERS AND THE CONTEXTUAL INFORMATION

508
EVALUATE AN EVIDENCE QUALITY, AN EVIDENCE SUFFICIENCY AND AN EVIDENCE COMPLETENESS OF THE PROCESSED EVIDENCE DATA BASED ON THE PERFORMED SIMILARITY ANALYSIS, INTRINSIC FACTORS AND EXTRINSIC INPUTS

510
DETERMINE ONE OR MORE ACTIONS TO BE PERFORMED ON THE PROCESSED EVIDENCE DATA BASED ON THE EVALUATED EVIDENCE QUALITY, THE EVIDENCE SUFFICIENCY AND THE EVIDENCE COMPLETENESS

512
PERFORM THE DETERMINED ONE OR MORE ACTIONS ON THE PROCESSED EVIDENCE DATA TO RESOLVE THE ONE OR MORE EVENTS

FIG. 5

SYSTEM AND METHOD FOR COLLABORATIVE SMART EVIDENCE GATHERING AND INVESTIGATION FOR INCIDENT RESPONSE, ATTACK SURFACE MANAGEMENT, AND FORENSICS IN A COMPUTING ENVIRONMENT

CROSS-REFERENCE TO RELATED APPLICATION(S)

This application claims the priority to incorporate by reference the entire disclosure of U.S. provisional patent application No. 63/421,000, filed on 31 Oct. 2022, titled "Methods and systems for collaborative smart evidence gathering & investigation for incident response, attack surface management, and forensics".

TECHNICAL FIELD

Embodiments of the present disclosure relate to evidence gathering systems, and more particularly relate to a system and method for collaborative smart evidence gathering and investigation for incident response, attack surface management, and forensics in a computing environment.

BACKGROUND

Generally, organizations face an ever-increasing number of cyber threats in the rapidly evolving landscape of cyber-security, ranging from sophisticated attacks to insider breaches. As a response to this escalating risk, incident response, attack surface management, and digital forensics have become crucial components of a comprehensive cyber-security strategy. These practices aim to identify, investigate, and mitigate security incidents, as well as gather evidence to understand the nature of the attack and its impact.

Conventionally, the process of evidence gathering, and investigation has been a labor intensive and time-consuming task. It heavily relied on manual collection, categorization, and classification of data from various sources. Data relevant to an incident was often distributed across multiple systems of record, making it essential to develop methodologies to combine and consolidate this data into a common schema and ontology for efficient storage and retrieval. In this conventional approach, pieces of evidence were considered static and were viewed as snapshots representing specific realities at a given point in time. This limitation often posed challenges when attempting to trace the timeline of an attack or establish a coherent narrative of events leading up to and during an incident.

Moreover, incident response, attack surface management, and forensics have been collaborative endeavors involving multiple team members with diverse expertise. These professionals work together to analyze the gathered evidence and collectively make inferences to understand the nature and scope of the security incident. The collaboration among team members was typically managed through a combination of manual workflows and computerized tools. While some aspects of sharing evidence and information were automated, there was still a significant dependency on manual coordination, communication, and decision-making processes. This approach could lead to delays and inefficiencies, hindering the timely resolution of security incidents and exposing organizations to prolonged periods of vulnerability.

Consequently, there is a need for an improved system and method for collaborative smart evidence gathering and investigation for incident response, attack surface management, and forensics in a computing environment, to address at least the aforementioned issues in the prior art.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

An aspect of the present disclosure provides a computer-implemented system for collaborative smart evidence gathering and investigation for incident response, attack surface management, and forensics in a computing environment. The system obtains evidence data corresponding to one or more events from multiple data sources, multimodal and multi-context entries, and initiation points. The evidence data comprises one or more parameters and contextual information. Further, the system processes the obtained evidence data into one or more investigation categories based on the one or more parameters and contextual information using an artificial intelligence (AI) root cause analysis, graph augmented retrieval, semantic classifier, meaning extraction, and causal discovery model. The evidence data may be processed by classifying, enriching, explaining, and understanding, obtained evidence data. Furthermore, the system performs similarity analysis for the processed evidence data based on the one or more parameters and the contextual information. Additionally, the system evaluates an evidence quality, an evidence sufficiency, and an evidence completeness of the processed evidence data based on the performed similarity analysis, intrinsic factors, and extrinsic inputs. Also, the system determines one or more actions to be performed on the processed evidence data based on the evaluated evidence quality, the evidence sufficiency, and the evidence completeness. Further, the system performs the determined one or more actions on the processed evidence data to resolve the one or more events.

Another aspect of the present disclosure provides a computer-implemented method for collaborative smart evidence gathering and investigation for incident response, attack surface management, and forensics in a computing environment. The method includes obtaining evidence data corresponding to one or more events from multiple data sources, multimodal and multi-context entries, and initiation points. The evidence data comprises one or more parameters and contextual information. Further, the one or more events correspond to at least one of security and operational incidents, proactive attack surface management, and post facto forensics. Further, the method includes processing the obtained evidence data into one or more investigation categories based on the one or more parameters and contextual information using an artificial intelligence (AI) root cause analysis, graph augmented retrieval, semantic classifier, meaning extraction, and causal discovery model. The evidence data may be processed by classifying, enriching, explaining, and understanding, obtained evidence data. Furthermore, the method includes performing similarity analysis for the processed evidence data based on the one or more parameters and the contextual information. Additionally, the method includes evaluating an evidence quality, an evidence sufficiency, and an evidence completeness of the processed evidence data based on the performed similarity analysis, intrinsic factors, and extrinsic inputs. Further, the method includes determining one or more actions to be performed on the processed evidence data based on the evaluated evidence quality, the evidence sufficiency, and the evidence completeness. Furthermore, the method includes performing the determined one or more actions on the processed evidence data to resolve the one or more events.

A non-transitory computer-readable storage medium having instructions stored therein that, when executed by one or more processors, cause the one or more processors to perform method steps. The one or more processors obtain evidence data corresponding to one or more events from multiple data sources, multimodal and multi-context entries, and initiation points. The evidence data comprises one or more parameters and contextual information. Further, the one or more processors process the obtained evidence data into one or more investigation categories based on the one or more parameters and contextual information using an artificial intelligence (AI) root cause analysis, graph augmented retrieval, semantic classifier, meaning extraction, and causal discovery model. The evidence data may be processed by classifying, enriching, explaining, and understanding, obtained evidence data. Furthermore, the one or more processors perform similarity analysis for the processed evidence data based on the one or more parameters and the contextual information. Additionally, the one or more processors evaluate an evidence quality, an evidence sufficiency, and an evidence completeness of the processed evidence data based on the performed similarity analysis, intrinsic factors, and extrinsic inputs. Also, the one or more processors determine one or more actions to be performed on the processed evidence data based on the evaluated evidence quality, the evidence sufficiency, and the evidence completeness. Further, the one or more processors perform the determined one or more actions on the processed evidence data to resolve the one or more events.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF ACCOMPANYING DRAWINGS

The disclosure will be described and explained with additional specificity and detail with the accompanying figures in which:

FIG. 4A illustrates an exemplary process flow diagram representation of a method for continuous and iterative evidence assessment, along with additional evidence gathering, in accordance with an embodiment of the present disclosure;

FIG. 4C illustrates an exemplary process flow diagram representation of a method of creating, generating, and refining evidence to supplement and construct better decisions, in accordance with an embodiment of the present disclosure;

Figure 6:
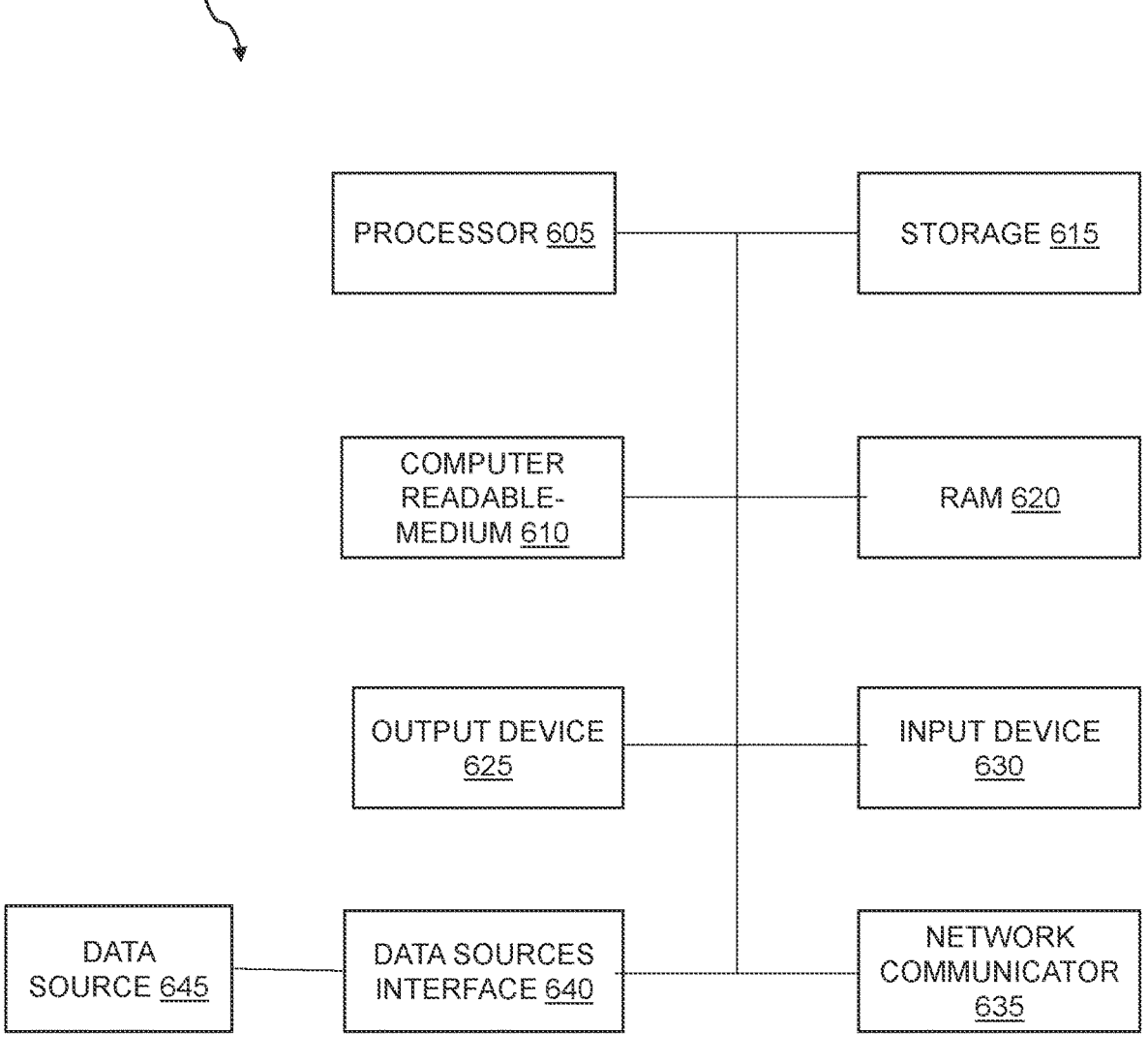

FIG. 5 illustrates a flow chart depicting a method of collaborative smart evidence gathering and investigation for incident response, attack surface management, and forensics in the computing environment, in accordance with the embodiment of the present disclosure; and FIG. 6 illustrates an exemplary block diagram representation of a hardware platform for implementation of the disclosed system, according to an example embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise," "comprising," or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment," "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client, or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired), or temporarily configured (programmed) to operate in a certain manner and/or to perform certain operations described herein.

Embodiments of the present disclosure provide a system and method for collaborative smart evidence gathering and investigation for incident response, attack surface management, and forensics in a computing environment. The present disclosure provides a system and method for efficiently collecting evidence from various sources, including infrastructure and applications, in different formats, ensuring a comprehensive view of incidents. The evidence is cataloged, tagged, and classified, making the evidence easily accessible for manipulation and retrieval. Additionally, evidence enrichment techniques in the present disclosure improve data quality, while the ability to replay evidence recreates contextual information for better understanding and analysis. The involvement of a computer-managed smart expert system enhances the investigation process, contributing to evidence collection, submission, and decision-making. Moreover, automatic, and continuous evidence collection, as well as effective collaboration among participants, streamlines the investigation process. The creation of hypothetical evidence scenarios and refinement techniques assist in deeper reasoning and filling gaps in the evidence. The present disclosure provides a system and method for automatically surfacing inferences and deductions based on the evidence, allowing for effective conclusion of cases and the potential for further exploration and investigation paths.

Referring now to the drawings, and more particularly to FIG. 1 through FIG. 6, where similar reference characters denote corresponding features consistently throughout the figures, there are shown preferred embodiments, and these embodiments are described in the context of the following exemplary system and/or method.

Figure 1:
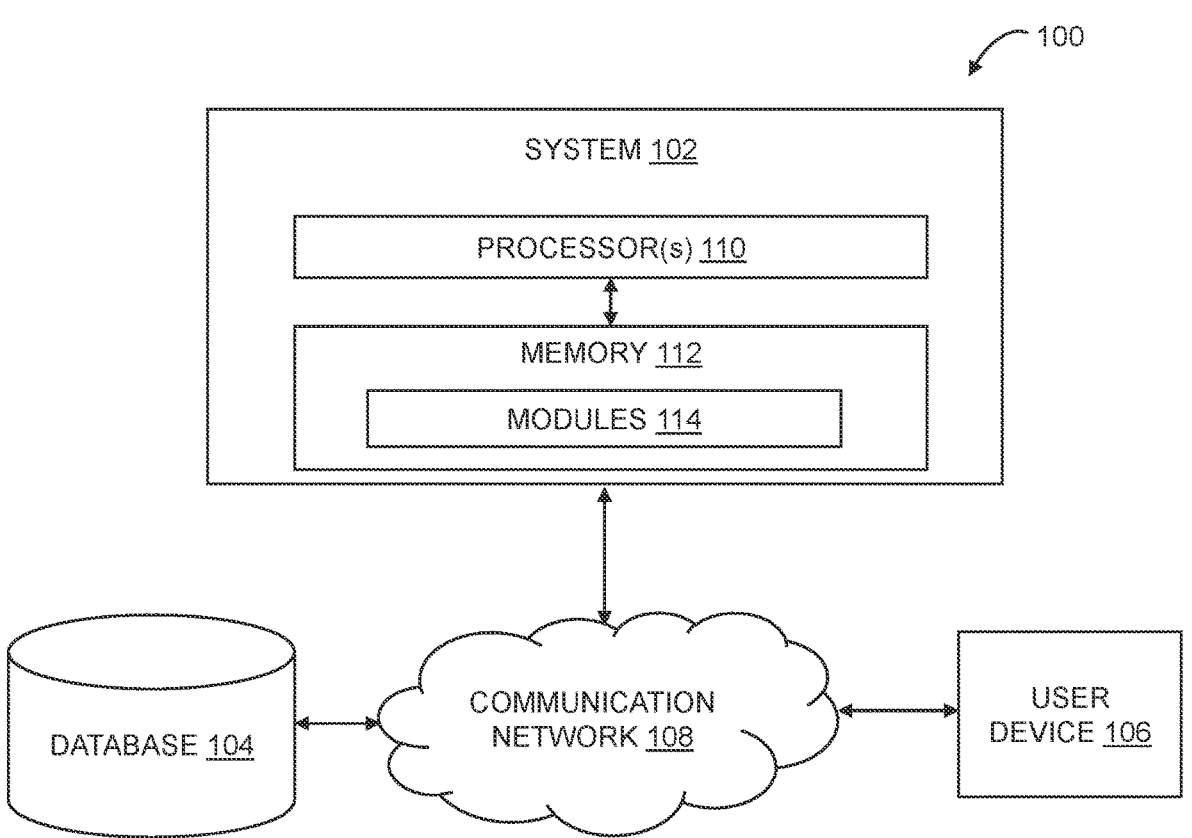
FIG. 1 illustrates an exemplary block diagram representation of a network architecture implementing a system for collaborative smart evidence gathering and investigation for incident response, attack surface management, and forensics in a computing environment, in accordance with an embodiment of the present disclosure.

FIG. 1 illustrates an exemplary block diagram representation of a network architecture 100 implementing a system 102 for collaborative smart evidence gathering and investigation for incident response, attack surface management, and forensics in a computing environment, in accordance with an embodiment of the present disclosure. According to FIG. 1, the network architecture 100 includes the system 102, a database 104, and one or more user devices 106 associated with one or more users, communicatively coupled to the system 102 via a communication network 108. In an exemplary embodiment of the present disclosure, the one or more user devices 106 may include a laptop computer, desktop computer, tablet computer, smartphone, wearable device, digital camera, and the like. Further, the communication network 106 may be a wired communication network and/or a wireless communication network. In an example, the system 102 may be hosted on a central server, such as a cloud server or a remote server. The system 102 may be communicatively coupled to the database 104, and the user device 106 via the communication network 108. The database 104 may include, but not limited to, evidence data, classified evidence data, missing data, one or more parameters, contextual information, dataset, visual representation information, search parameters, evidence quality, evidence sufficiency, evidence completeness, any other data, and combinations thereof. The database 104 may be any kind of database such as, but not limited to, relational databases, dedicated databases, dynamic databases, monetized databases, scalable databases, cloud databases, distributed databases, any other databases, and a combination thereof.

Further, the user device 106 may be associated with, but not limited to, a user, an individual, an administrator, a vendor, a technician, a worker, a specialist, a healthcare worker, an instructor, a supervisor, a team, an entity, an organization, a company, a facility, a bot, any other user, and the combination thereof. The entities, the organization, and the facility may include, but not limited to, a hospital, a healthcare facility, an exercise facility, a laboratory facility, an e-commerce company, a merchant organization, an airline company, a hotel booking company, a company, an outlet, a manufacturing unit, an enterprise, an organization, an educational institution, a secured facility, a warehouse facility, a supply chain facility, any other facility, and the like. The user device 106 may be used to provide input and/or receive output to/from the system 102, and/or to the database 104, respectively. The user device 106 has the capability to display one or more user interfaces, allowing the user to engage with the system 102 and/or the collaborative smart evidence gathering and investigation for incident response, attack surface management, and forensics requirements in the database 104. The user device 106 may be at least one of an electrical, electronic, electromechanical, and computing device. The user device 106 may include, but not limited to, a mobile device, a smartphone, a personal digital assistant (PDA), a tablet computer, a phablet computer, a wearable computing device, a virtual reality/augmented reality (VR/AR) device, a laptop, a desktop, a server, and the like.

Further, the system 102 may be implemented by way of a single device or a combination of multiple devices that may be operatively connected or networked together. The system 102 may be implemented in hardware or a suitable combination of a hardware and a software. The system 102 includes one or more processors 110, and a memory 112. The memory 112 may include a plurality of modules 114. The system 102 may be a hardware device including the one or more processors 110 executing machine-readable program instructions for collaborative smart evidence gathering and investigation for incident response, attack surface management, and forensics. Execution of the machine-readable program instructions by the one or more processors 110 may enable the system 102 for collaborative smart evidence gathering and investigation for incident response, attack surface management, and forensics in the computing environment. The "hardware" may comprise a combination of discrete components, an integrated circuit, an application-specific integrated circuit, a field-programmable gate array, a digital signal processor, or other suitable hardware. The "software" may comprise one or more objects, agents, threads, lines of code, subroutines, separate software applications, two or more lines of code, or other suitable software structures operating in one or more software applications or on one or more processors.

The one or more processors 110 may include, for example, microprocessors, microcomputers, microcontrollers, digital signal processors, central processing units, state machines, logic circuits, and/or any devices that manipulate data or signals based on operational instructions. Among other capabilities, the one or more processors 110 may fetch and execute computer-readable instructions in the memory 112 operationally coupled with the system 102 for performing tasks such as data processing, input/output processing, and/or any other functions. Any reference to a task in the present disclosure may refer to an operation being or that may be performed on data.

Though few components and subsystems are disclosed in FIG. 1, there may be additional components and subsystems which is not shown, such as, but not limited to, ports, routers, repeaters, firewall devices, network devices, databases, network attached storage devices, servers, assets, machinery, instruments, facility equipment, emergency management devices, image capturing devices, any other devices, and combination thereof. The person skilled in the art should not be limiting the components/subsystems shown in FIG. 1. Although FIG. 1 illustrates the system 102, and the user device 106 connected to the database 104, one skilled in the art can envision that the system 102, and the user device 106 can be connected to several user devices located at different locations and several databases via the communication network 108.

Those of ordinary skilled in the art will appreciate that the hardware depicted in FIG. 1 may vary for particular implementations. For example, other peripheral devices such as an optical disk drive and the like, local area network (LAN), wide area network (WAN), wireless (e.g., wireless-fidelity (Wi-Fi)) adapter, graphics adapter, disk controller, input/output (I/O) adapter also may be used in addition or place of the hardware depicted. The depicted example is provided for explanation purposes only and is intended to illustrate the present disclosure without implying architectural limitations.

Those skilled in the art will recognize that, for simplicity and clarity, the full structure and operation of all data processing systems suitable for use with the present disclosure are not being depicted or described herein. Instead, only so much of the system 102 as is unique to the present disclosure or necessary for an understanding of the present disclosure is depicted and described. The remainder of the construction and operation of the system 102 may conform to any of the various current implementations and practices that were known in the art.

In an exemplary embodiment, the system 102 may obtain evidence data corresponding to one or more events from multiple data sources, multimodal and multi-context entries, and initiation points. The evidence data includes, but is not limited to, one or more parameters, contextual information, and the like. The one or more events correspond to, but not limited to, security and operational incidents, proactive attack surface management, post facto forensics, and the like.

In an exemplary embodiment, the system 102 may process the obtained evidence data into one or more investigation categories based on the one or more parameters and contextual information using an artificial intelligence (AI) root cause analysis, graph augmented retrieval, semantic classifier, meaning extraction, and causal discovery model. The evidence data may be processed by classifying, enriching, explaining, and understanding, obtained evidence data.

In an exemplary embodiment, the system 102 may perform similarity analysis for the processed evidence data based on the one or more parameters and the contextual information.

In an exemplary embodiment, the system 102 may evaluate an evidence quality, an evidence sufficiency, and an evidence completeness of the processed evidence data based on the performed similarity analysis, intrinsic factors, and extrinsic inputs.

In an exemplary embodiment, the system 102 may determine one or more actions to be performed on the processed evidence data based on the evaluated evidence quality, the evidence sufficiency, and the evidence completeness.

In an exemplary embodiment, the system 102 may perform the determined one or more actions on the processed evidence data to resolve the one or more events.

Figure 2:
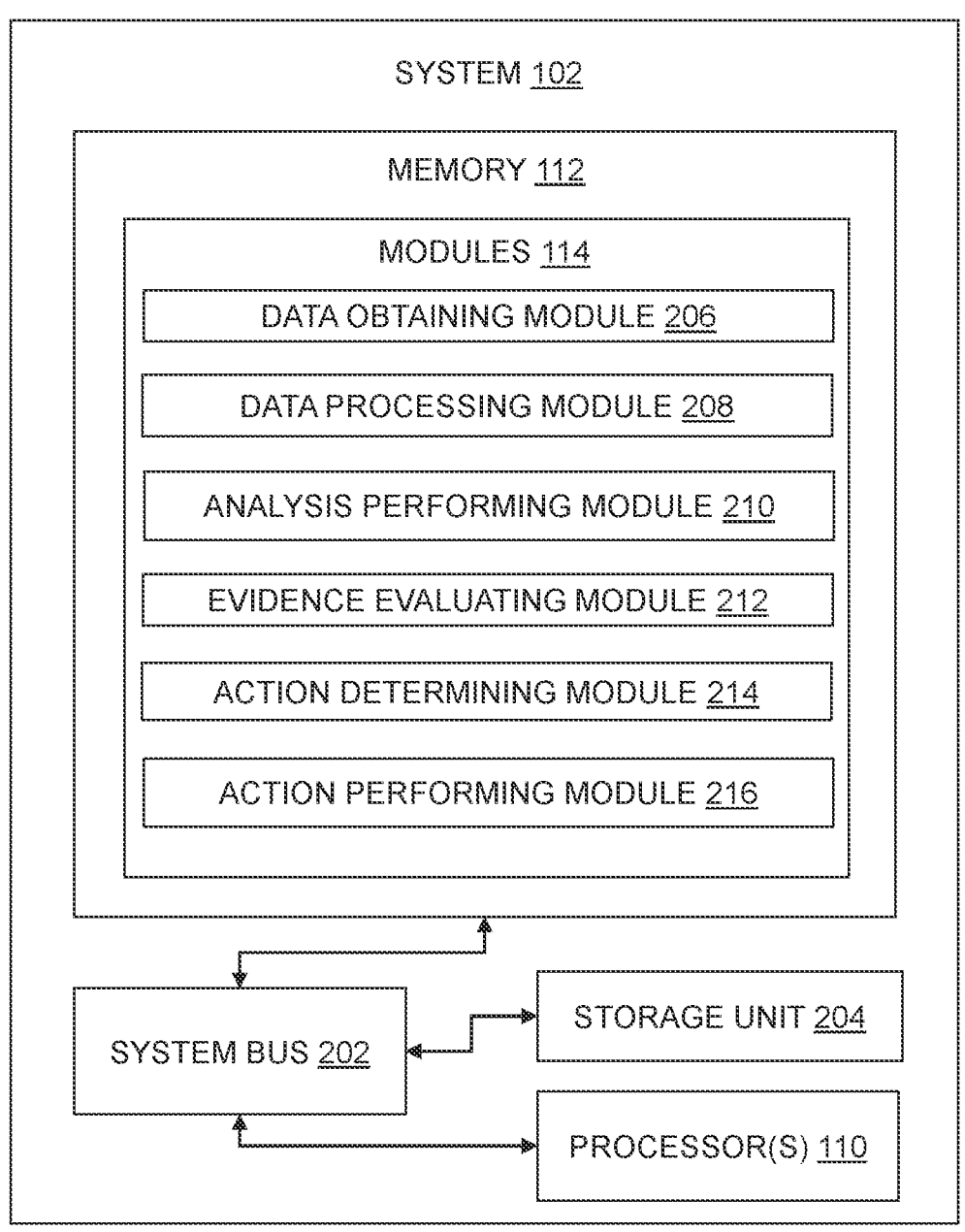
FIG. 2 illustrates an exemplary block diagram representation of a computer-implemented system, such as those shown in FIG. 1, capable of collaborative smart evidence gathering and investigation for incident response, attack surface management, and forensics in the computing environment, in accordance with an embodiment of the present disclosure.

FIG. 2 illustrates an exemplary block diagram representation of a computer-implemented system 102, such as those shown in FIG. 1, capable of collaborative smart evidence gathering and investigation for incident response, attack surface management, and forensics in the computing environment, in accordance with an embodiment of the present disclosure. The system 102 may also function as a computer-implemented system (hereinafter referred to as the system 102). The system 102 comprises the one or more processors 110, the memory 112, and a storage unit 204. The one or more processors 110, the memory 112, and the storage unit 204 are communicatively coupled through a system bus 202 or any similar mechanism. The memory 112 comprises a plurality of modules 114 in the form of programmable instructions executable by the one or more processors 110.

Further, the plurality of modules 114 includes a data obtaining module 206, a data processing module 208, an analysis performing module 210, an evidence evaluating module 212, an action determining module 214, and an action performing module 216.

The one or more processors 110, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more processors 110 may also include embedded controllers, such as generic or programmable logic devices or arrays, application-specific integrated circuits, single-chip computers, and the like.

The memory 112 may be a non-transitory volatile memory and a non-volatile memory. The memory 112 may be coupled to communicate with the one or more processors 110, such as being a computer-readable storage medium. The one or more processors 110 may execute machine-readable instructions and/or source code stored in the memory 112. A variety of machine-readable instructions may be stored in and accessed from the memory 112. The memory 112 may include any suitable elements for storing data and machine-readable instructions, such as read-only memory, random access memory, erasable programmable read-only memory, electrically erasable programmable read-only memory, a hard drive, a removable media drive for handling compact disks, digital video disks, diskettes, magnetic tape cartridges, memory cards, and the like. In the present embodiment, the memory 112 includes the plurality of modules 114 stored in the form of machine-readable instructions on any of the above-mentioned storage media and may be in communication with and executed by the one or more processors 110.

The storage unit 204 may be a cloud storage or the database 104 such as those shown in FIG. 1. The storage unit 204 may store, but not limited to, the evidence data, processed evidence data, missing data, one or more parameters, contextual information, dataset, visual representation information, search parameters, evidence quality, evidence sufficiency, evidence completeness, any other data, and the combinations thereof. The storage unit 204 may be any kind of database 104 such as, but not limited to, relational databases, dedicated databases, dynamic databases, monetized databases, scalable databases, cloud databases, distributed databases, any other databases, and the combination thereof.

In an exemplary embodiment, the data obtaining module 206 may obtain evidence data corresponding to one or more events from multiple data sources, multimodal and multi-context entries, and initiation points. The evidence data includes, but is not limited to, one or more parameters, contextual information, and the like. The one or more events correspond to, but not limited to, security and operational incidents, proactive attack surface management, post facto forensics, and the like.

In an exemplary embodiment, the data processing module 208 may process the obtained evidence data into one or more investigation categories based on the one or more parameters and the contextual information using an artificial intelligence (AI) root cause analysis, graph augmented retrieval, semantic classifier, meaning extraction, and causal discovery model.

In an exemplary embodiment, the analysis performing module 210 may perform similarity analysis for the processed evidence data based on the one or more parameters and the contextual information.

In an exemplary embodiment, the evaluating module 212 may evaluate the evidence quality, the evidence sufficiency, and the evidence completeness of the processed evidence data based on the performed similarity analysis, intrinsic factors, and extrinsic inputs.

In an exemplary embodiment, the action determining module 214 may determine one or more actions to be performed on the processed evidence data based on the evaluated evidence quality, the evidence sufficiency, and the evidence completeness. For determining one or more actions to be performed on the processed evidence data based on the evaluated evidence quality, the evidence sufficiency, and the evidence completeness, the plurality of modules 114 may further include a data storing module (not shown in FIG. 2) to store the processed evidence data into at least one of a bookmark library, collectible library, and a historical evidence library. Further, a data assigning module (not shown in FIG. 2) assigns the processed evidence data to at least one of an existing case and a new case based on a manifestation of the evidence data. The historical evidence library may include, but not limited to, historical and real-time information, relating to infrastructure and application states and corresponding properties, derived attributes and findings from state changes, operational measures, and metrics, data flow changes, relationship transitions among infrastructure and applications resources, and evolution of policy, configuration, constraints, and rules as it related to these resources and their interrelationships, and the like. The system 102 may record such searches, with their parameters and context, and their results in the form of a self and continuously organizing journal. It allows for collaboration among multiple participants, both human and machine. These methods are focused on providing a way to understand and respond to situations arising from security and operational incidents, proactive attack surface management, and post facto forensics.

Further, for determining one or more actions to be performed on the processed evidence data, the plurality of modules 114 further comprise an evidence type determining module (not shown in FIG. 2) to determine a type of required additional evidence to support investigation based on the evaluated evidence quality, the evidence sufficiency, and the evidence completeness.

Furthermore, for determining one or more actions to be performed on the processed evidence data based on the evaluated evidence quality, the plurality of modules 114 further comprises a replay determining module (not shown in FIG. 2) to determine the evidence to replay. Further, a data retrieving module (not shown in FIG. 2) retrieves dataset and visual representation information associated with the determined evidence. Additionally, a preview generating module (not shown in FIG. 2) generates an embedded preview of the determined evidence for replaying the determined evidence. Furthermore, a state assessing module (not shown in FIG. 2) assesses the state of the determined evidence before, during, and after a context when the determined evidence originally appeared.

Additionally, for determining one or more actions to be performed on the processed evidence data based on the evaluated evidence quality, the plurality of modules further comprises an evidence inferring module (not shown in FIG. 2) to infer additional evidence required to be gathered as a support to the obtained evidence data based on the evaluated evidence quality, the evidence sufficiency, and the evidence completeness. Further, an evidence obtaining module (not shown in FIG. 2) obtains the inferred additional evidence by defining search parameters corresponding to the inferred additional evidence. Also, an evidence simulating module (not shown in FIG. 2) simulates the obtained additional evidence to determine the evidence quality, the evidence sufficiency, and the evidence completeness of the additional evidence. Further, a pathway determining module (not shown in FIG. 2) determines an exploitation pathway for the additional evidence using generative and adversarial AI models. Furthermore, a missing data determining module (not shown in FIG. 2) determines missing data in the additional evidence based on the determined exploitation pathway, determined evidence quality, the evidence suffi-ciency, and the evidence completeness of the additional evidence. Additionally, an evidence refining data (not shown in FIG. 2) refines the additional evidence to recreate the determined missing data.

In an exemplary embodiment, for determining one or more actions to be performed on the processed evidence data based on the evaluated evidence quality, the plurality of modules 114 further comprises a root cause determining module (not shown in FIG. 2) to determine possible root causes for the additional evidence. Further, a weight assign-ing module (not shown in FIG. 2) assigns likelihood weights to each of the determined possible root causes. Furthermore, a state determining module (not shown in FIG. 2) determines the state of investigation of the one or more events based on the assigned likelihood weights.

In an exemplary embodiment, for determining one or more actions to be performed on the processed evidence data based on the evaluated evidence quality, the plurality of modules 114 further comprises a query triggering module (not shown in FIG. 2) to trigger additional questions and queries associated with the obtained evidence data for improving evidence quality.

In an exemplary embodiment, the action performing module 216 may perform the determined one or more actions on the processed evidence data to resolve the one or more events.

In an exemplary embodiment, the plurality of modules further comprises a participation enabling module (not shown in FIG. 2) to enable participation of a computer generated smart expert system as a member of an evidence gathering and investigation team. Further, a decision gen-erating module (not shown in FIG. 2) may generate collec-tive decisions on the one or more events based on decisions collected from the computer generated smart expert system. Furthermore, a workflow communication enabling module (not shown in FIG. 2) may enable threaded conversation and workflow centric resolution between the computer generated smart expert system to resolve the one or more events. Additionally, a first class investigator (not shown in FIG. 2) may manage investigation process state over time to time for the one or more events.

In an exemplary embodiment, the plurality of modules further comprises an evidence managing module (not shown in FIG. 2) to perform at least one of evidence ordering, sorting, stitching, and weighting for determination of attack paths, attack vectors, indicators of compromise, vulnerabil-ity impact, exploitable entry points, and security centric blast radius and impact zone calculations.

In one aspect, the present disclosure provides a method for effective and efficient evidence gathering. The methods and systems in this present disclosure facilitate the collec-tion of evidence from multiple sources, including but not limited to infrastructure, applications, their interactions, properties, and supplemental information derived from their operational context, usage, behavior, and evolution over time. The type of evidence could be multi-modal, manifest-ing as text, image, replay able media, video, or other computer managed formats. The evidence could relate to a specific time or snapshot of the state. It could also include boundaries defined by a temporal window. The evidence gathering process can be initiated and triggered in multiple ways including bookmarking of an explicit search or intent based retrieval, recording of a report-based query, storage of study and analysis of evolution over time, the inclusion of analysis of an alert, notification, or indicator of compromise, attack, or a fault, and capture of a specific selection of state of a single or multiple artifacts. The present disclosure includes the participation of a computer managed smart expert system that could collect and record evidence on a scheduled cadence or another participant triggered action. Some embodiments of this aspect include evidence catalog-ing, tagging, explanation, illustration, summarization, and classification. Once evidence is collected, the evidence is implicitly and explicitly segregated into buckets for easy storage, manipulation, and retrieval. The investigation pro-cess includes the concept of an investigation diary that may be stored and implemented using a computer program and media. Cataloging and bucketing also involve putting related evidence on the same or related pages of such an investigation diary.

Some embodiments may include evidence enrichment as a part of the method. Enrichment involves improving and enhancing the quality of the collected data by collecting additional data that supplements it. It also involves trigger-ing additional questions and queries to improve evidence quality. Extraction of entities and semantic meaning, con-textual analysis, and causal discovery exploration are included as a part of the enrichment of data. In another aspect, the present disclosure provides a system for replay-ing evidence as it may have occurred in the past. Replaying the evidence involves recreation of the context and state before, during, and after the time when the evidence became available. It involves the ability to dynamically interact with and control the evidence execution environment for better understanding and further analysis. This aspect also pro-vides methods and constructs for easy and fast evidence replay.

In another aspect, the present disclosure provides a sys-tem for enabling the participation of a computer generated smart expert system as a member of the evidence gathering and investigation team. This facilitates and makes it possible for the intelligent machine to be an active participant and carry out actions like evidence collection, submission, enrichment, and analysis. It also provides methods for the smart expert system to participate in the inference and decision-making process. Some include automatic and con-tinuous evidence collection. Once initial evidence is col-lected, additional evidence could be collected without a human agent participation or AI co-pilot. The collection process involves findings of similar, related, and different but pertinent evidence.

In another aspect, the present disclosure provides a method and apparatus for effective collaboration among multiple participants while gathering evidence. It also pro-vides for a process to manage the investigation process state evolution over time. In yet another aspect, the present disclosure provides a method of evidence creation. The scope of creation involves a construction of hypothetical but similar scenarios in the context of already collected evi-dence. Created evidence acts as a supplement for deeper reasoning and root cause analysis. It does not replace the actual evidence. Some embodiments include refinement techniques, including approximation and artificial intelli-gence generative methods, for simulation and recreation of possible missing pieces from the evidence. In yet another aspect, this present disclosure provides methods and systems for automatic surfacing of inference and deduction based on collected and processed evidence. Some embodiments pro-vide a system for a conclusion of cases that need investi-gation. These also provide a means for confirmation or dispute leading to either conclusion or additional evidence gathering. In yet another aspect, the present disclosure provides a process for spawning newer evidence gathering and investigation actions, including path diversion and diversification for further exploration. Some embodiments provide a system for the automatic generation of summaries and annotated reports of investigation diaries and their associated evidence for the purposes of retrospection, further analysis, reporting, and required filings. In yet another aspect, the present disclosure provides a process for including data from past investigations, which may be present in external systems or stored in computer media, for the comprehensive building of context, relationship, and knowledge to assist in reasoning, inference, and decision making of current and future investigations and analysis.

Figure 3A:
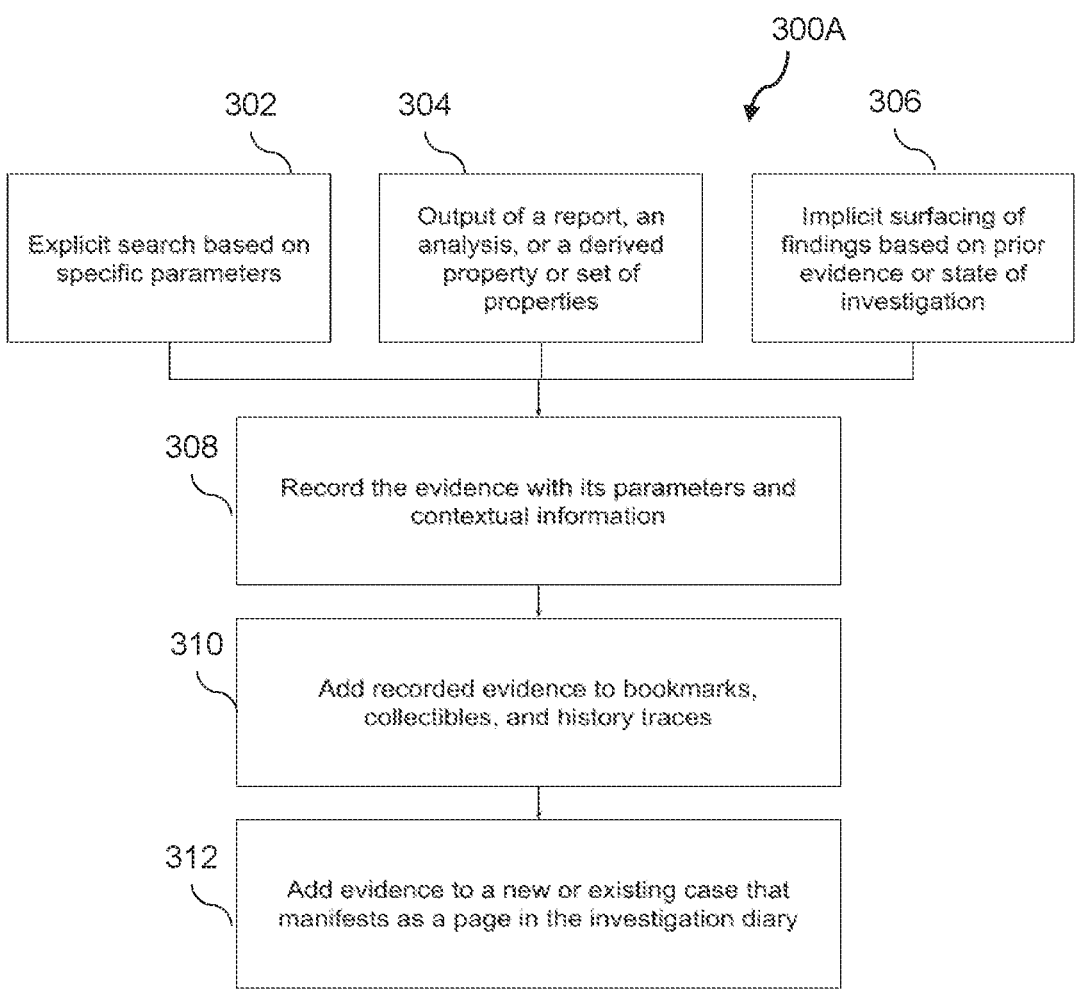
FIG. 3A illustrates an exemplary process flow diagram representation of a method for capturing and recording evidence, in accordance with an embodiment of the present disclosure.

FIG. 3A illustrates an exemplary process flow diagram representation of a method 300A for capturing and recording evidence, in accordance with an embodiment of the present disclosure. Evidence collection and recording are fundamental components of the investigation process. FIG. 3A illustrates the process flow for gathering evidence, which can be initiated explicitly (as shown in steps 302 and 304) or implicitly by an automated system (step 306).

At step 302, the method 300A includes explicitly searching, by the one or more processors 110, based on specific parameters.

At step 304, the method 300A includes explicitly outputting, by the one or more processors 110, a report, an analysis, or a derived property or a set of properties.

At step 306, the method 300A includes implicitly surfacing, by the one or more processors 110, finding based on prior evidence or state of investigation.

At step 308, the method 300A includes explicitly recording, by the one or more processors 110, the evidence with respective parameters and contextual information.

At step 310, the method 300A includes adding, by the one or more processors 110, recorded evidence to bookmarks, collectibles, and history traces.

At step 312, the method 300A includes adding, by the one or more processors 110, evidence to a new or existing case that manifests as a page in the investigation diary.

In either scenario, the evidence goes through several steps, including recording as part of a collection or historical trace, and being added to a dedicated page in an investigation diary. In certain instances, the initial evidence may prompt the creation of a new page in the investigation diary. Moreover, the process allows for the inclusion of evidence relevant to multiple investigations and multiple pages within an investigation diary, ensuring a comprehensive and organized approach to evidence management.

Figure 3B:
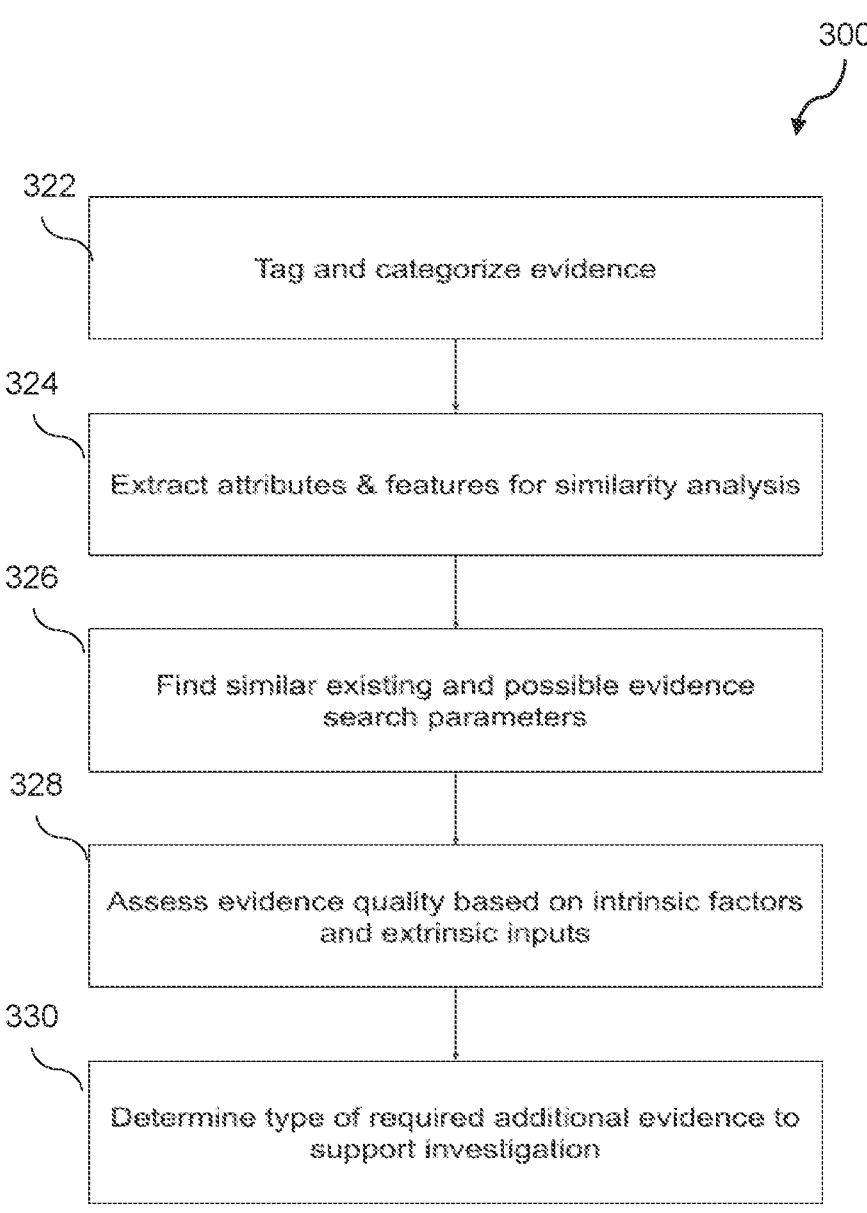
FIG. 3B illustrates an exemplary process flow diagram representation of a method for tagging and enrichment of the evidence, in accordance with an embodiment of the present disclosure.

FIG. 3B illustrates an exemplary process flow diagram representation of a method 300B for tagging and enrichment of the evidence, in accordance with an embodiment of the present disclosure. FIG. 3B illustrates a comprehensive example process for evidence tagging, classification, cataloging, and enrichment. At step 322, the method 300B includes tagging and categorizing, by the one or more processors 110, evidence. At step 324, the method 300B includes extracting, by the one or more processors 110, attributes and features from the evidence, forming the basis for determining similarities with other artifacts. At step 324, the method 300B includes utilizing, by the one or more processors 110, the attributes and features to identify similar artifacts effectively. At steps 326 and 328, the method 300B includes measuring, by the one or more processors 110, evidence quality, considering factors such as completeness, accuracy, relevance, freshness, new pathway exploration, and explicit human participant feedback and inputs. Based on the assessment of evidence quality, additional evidence is gathered to enhance the investigation further.

One key aspect of the embodiments herein is evidence replay, as demonstrated in the diagram. By replaying the evidence and capturing its context before, during, and after its occurrence, a detailed and profound understanding of its origin and significance in the investigation is achieved. This context-rich replay facilitates a comprehensive explanation of the case and greatly assists in the investigation process.

Figure 3C:
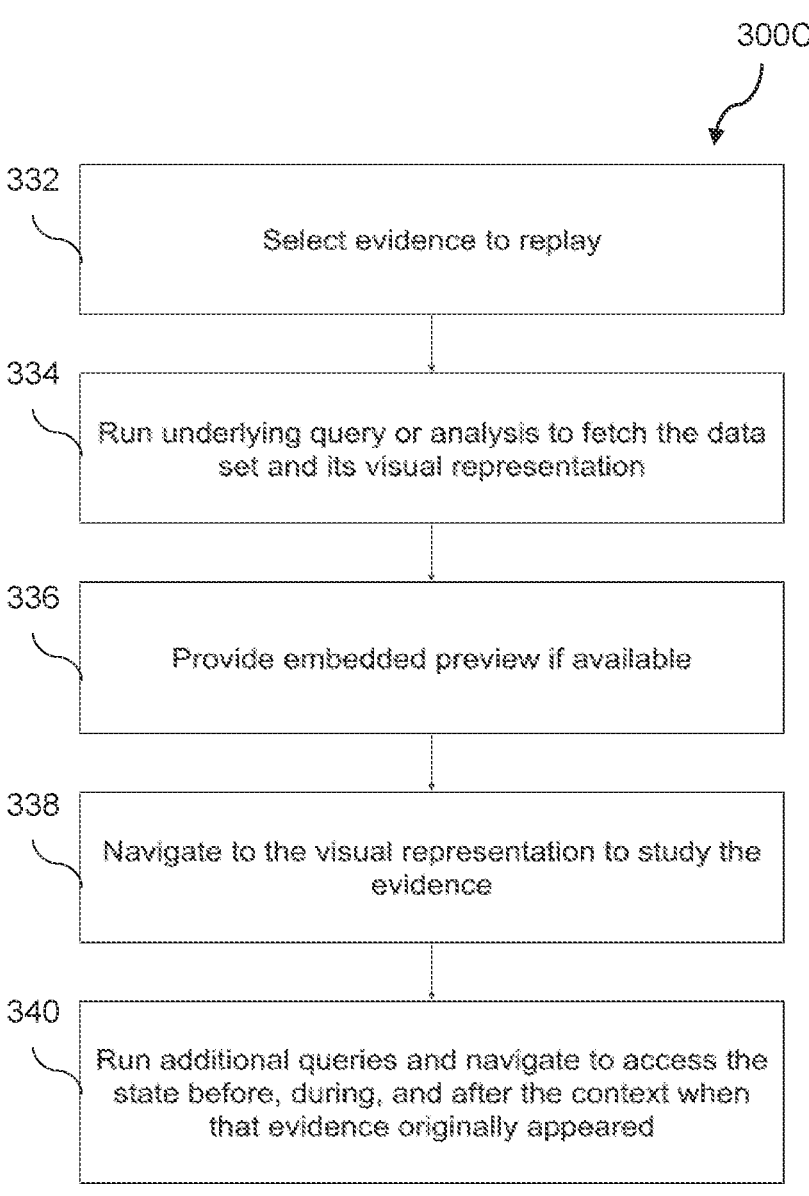
FIG. 3C illustrates an exemplary process flow diagram representation of a method for replaying of gathered evidence for deeper analysis, in accordance with an embodiment of the present disclosure.

FIG. 3C illustrates an exemplary process flow diagram representation of a method 300C for replaying of gathered evidence for deeper analysis, in accordance with an embodiment of the present disclosure. At step 332, the method 300C includes selecting, by the one or more processors 110, evidence to replay. At steps 334 and 336, the method 300C includes providing, by the one or more processors 110, the processes and equipment designed for evidence replay, providing the capability to preview the evidence before deciding to survey and explore its details. At steps 338 and 340, the method 300C includes enabling, by the one or more processors 110, in-depth analysis and exploration of the evidence.

A key feature of the embodiments herein is the collaboration between human participants and artificial intelligence-based smart expert systems, working together as team members. This collaborative approach ensures an effective and efficient investigation, leveraging the expertise of both human and AI team members for comprehensive and insightful results.

Figure 3D:
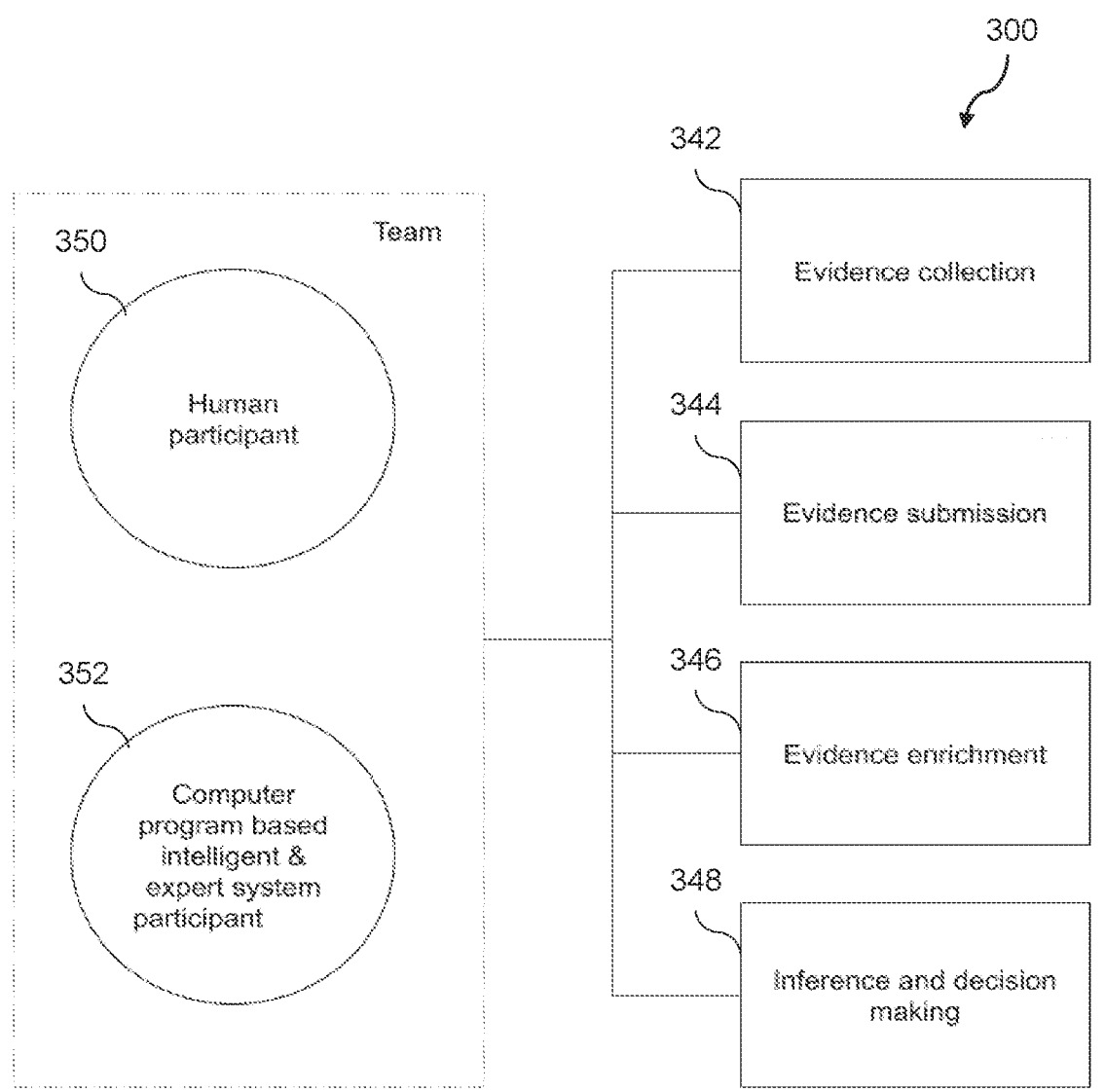
FIG. 3D illustrates an exemplary process flow diagram representation of the significance of smart expert systems based on an integration of artificial intelligence-based smart expert systems and human participants, in accordance with an embodiment of the present disclosure.

FIG. 3D illustrates an exemplary process flow diagram representation of the significance of smart expert systems based on the integration of artificial intelligence-based smart expert systems and the human participants, in accordance with an embodiment of the present disclosure. Distinct domains are explicitly identified, including an evidence collection 342, an evidence submission 344, an evidence enrichment 346, an evidence inference, and decision-making 348. Notably, both human participants 350 and machine participants 352 collaborate as equal team members within these domains. The effectiveness of this method and process is attributed to the combined involvement of expert human intelligence and machine intelligence. Additionally, the system's 102 capability to enhance evidence quality further contributes automatically and continuously to its efficacy.

FIG. 4A illustrates an exemplary process flow diagram representation of method 400A for continuous and iterative evidence assessment, along with additional evidence gathering, in accordance with an embodiment of the present disclosure. FIG. 4A outlines the steps through which the system enables continuous assessment of evidence quality and the gathering of additional evidence. As the system 102 undergoes multiple iterations, it progressively reaches a point where inference and causal analysis become more evident, leading to a reduction in iterative loops and convergence (step 408). At this stage, parallel runs may branch off to either maintain the same iteration rate (step 402) or slow down the iterative process (step 410), based on the decision-making process. Investigations rarely occur in isolation: they typically involve collaborative teams engaged in evidence gathering and conducting the investigation. This method fosters effective collaboration between both human participants and smart expert systems, empowering them to work together seamlessly and efficiently throughout the investigation process.

Figure 4B:
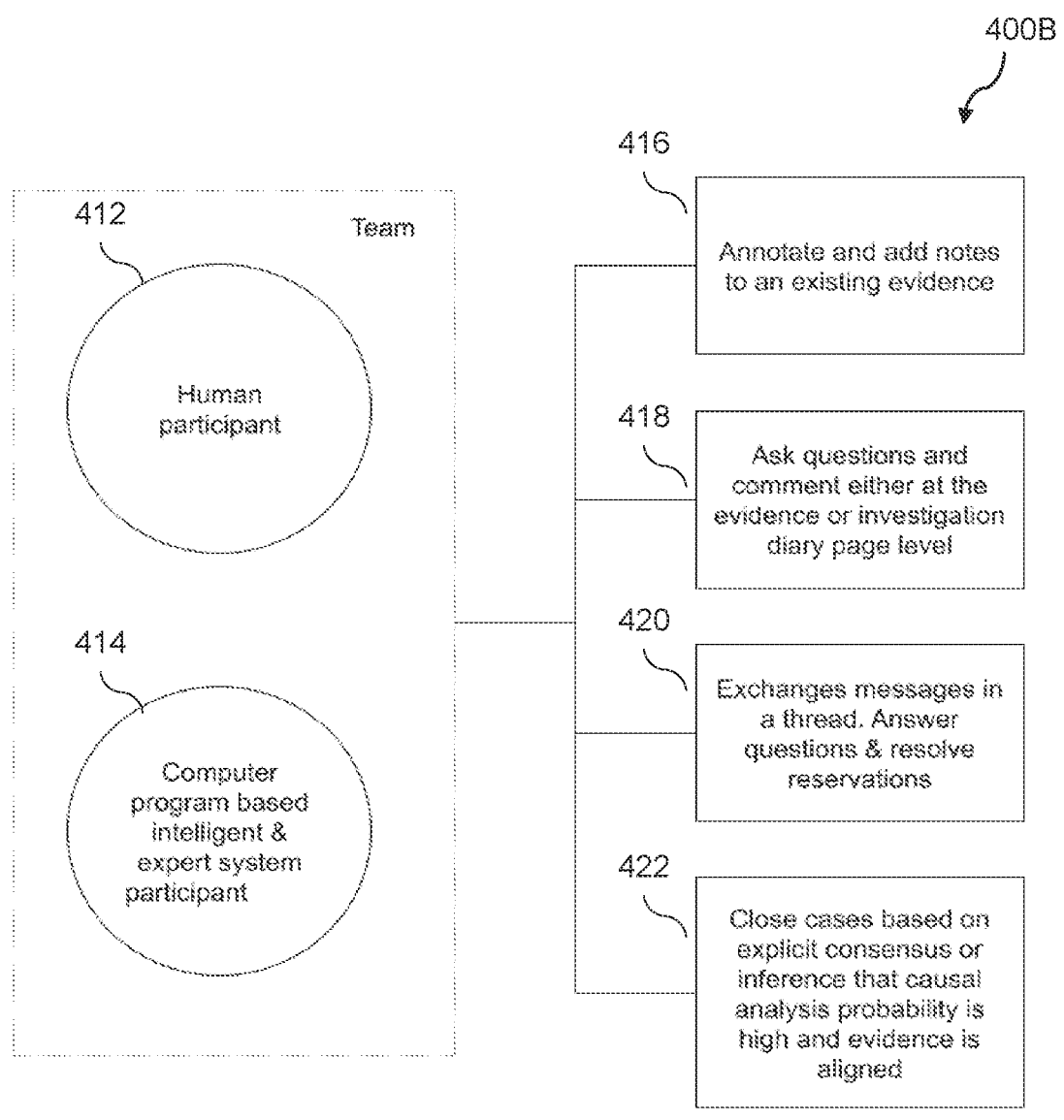
FIG. 4B illustrates an exemplary process flow diagram representation of a method for collaborating in different ways with team participants, both humans and machines, in accordance with an embodiment of the present disclosure.

FIG. 4B illustrates an exemplary process flow diagram representation of method 400B collaborating in different ways with team participants, both humans and machines, in accordance with an embodiment of the present disclosure. FIG. 4B illustrates, for example, four effective ways in which team members collaborate during the investigation process. Participants such as human participant 412 and computer-based intelligence and smart expert system-based participant 414 may add annotations and notes to existing evidence, offering additional context to enhance understanding (step 416). Moreover, team members can question submitted evidence, evaluate its accuracy, completeness, or relevance, and add comments for further explanation or suggest collecting more evidence (step 418). The collaboration also involves threaded conversations and workflow-centric resolution (step 420), facilitating structured and efficient communication among team members. At step 606, the cases may be closed explicit convergence and consensus-based case or causal analysis probability and evidence alignment.

In addition to explicit convergence and consensus-based case closure, the method introduces a novel approach to closing cases based on an automatic determination of causal analysis probability and evidence alignment. This automated closure process streamlines the investigation, optimizing efficiency without compromising accuracy. Furthermore, the embodiments herein incorporate novel techniques of exploration and evidence creation that complement traditional deduction-based inference processes. These innovative techniques expand the scope and depth of the investigation, leading to more comprehensive and insightful results.

FIG. 4C illustrates an exemplary process flow diagram representation of method 400C of creating, generating, and refining evidence to supplement and construct better decisions, in accordance with an embodiment of the present disclosure.

At step 432, the method 400C includes continuously assessing, by the one or more processors 110, the collected evidence for quality, sufficiency, and completeness. The processor 110 may be, but not limited to, hardware components, software modules, or a combination of both of these and the like.

At step 434, the method 400C includes inferencing and surfacing, by the one or more processors 110, additional evidence that needs to be gathered. At steps 436 and 438, the method 400C includes simulating, extrapolating, and approximating possibilities to refine evidence. These processes involve techniques from the domain of generative and adversarial machine learning, which facilitate path exploration and the identification of exploitation pathways. At step 440, the method 400C includes determining, by the one or more processors 110, if created and generated evidence helps in reasoning better. If yes, then iterate further and refine the evidence.

The main objective of the method and process is to enhance the effectiveness and efficiency of investigations. To achieve this goal, the steps for decision-making and convergence towards final inference are defined. In cases where the evidence is inconclusive or leads to conflicting outcomes, the possibility of initiating new investigations is considered. Apart from explicit human actions and decisions to converge and close an investigation, probabilistic reasoning based on weights is employed to determine if consensus is reached and if the outcome is both explainable and reasonable. This ensures a more robust and comprehensive investigative approach.

Figure 4D:
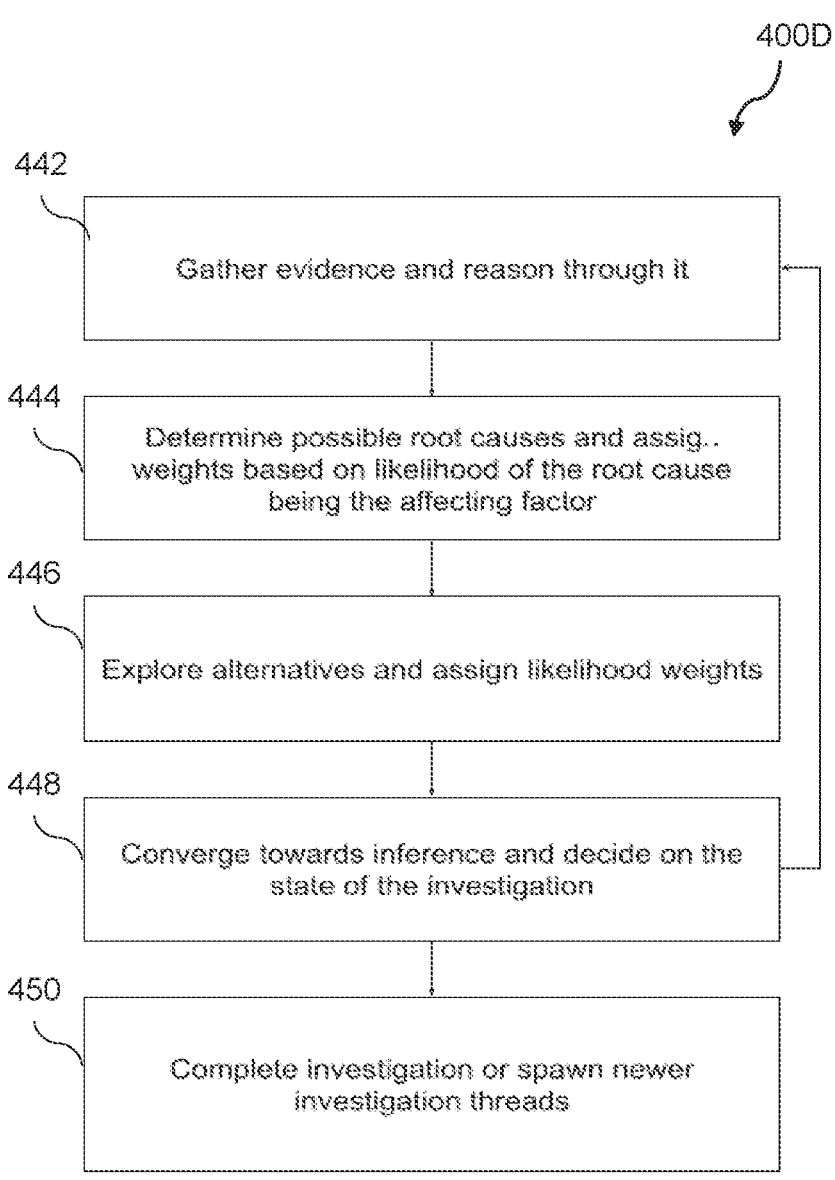
FIG. 4D illustrates an exemplary block diagram representation of a method of assessing evidence to decide and either converge or spawn newer investigations, in accordance with an embodiment of the present disclosure.

FIG. 4D illustrates an exemplary block diagram representation of method 400D of assessing evidence to decide and either converge or spawn newer investigations, in accordance with an embodiment of the present disclosure.

At step 442, the method 400D includes gathering, by the one or more processors 110, evidence and associated reasons. At step 444, the method 400D includes determining, by the one or more processors 110, possible root cause and assigning weights based on the likelihood of the root cause being the affecting factor. At step 446, the method 400D includes exploring, by the one or more processors 110, alternatives and assigning likelihood weights. At step 448, the method 400D includes converging, by the one or more processors 110, towards inference and deciding on the state of the investigation. At step 450, the method 400D includes completing, by the one or more processors 110, investigation or spawning newer investigation needs.

FIG. 5 illustrates a flow chart depicting a method 500 of collaborative smart evidence gathering and investigation for incident response attack surface management and forensics in the computing environment, in accordance with the embodiment of the present disclosure.

At block 502, the method 500 may include obtaining, by one or more processors 110, evidence data corresponding to one or more events from multiple data sources, multimodal and multi-context entries, and initiation points. The evidence data includes, but is not limited to, the one or more parameters, the contextual information, and the like. Further, the one or more events correspond to, but not limited to, security and operational incidents, proactive attack surface management, post facto forensics, and the like.

At block 504, the method 500 may include processing, by the one or more processors 110, the obtained evidence data into one or more investigation categories based on the one or more parameters and contextual information using an artificial intelligence (AI) root cause analysis, graph augmented retrieval, semantic classifier, meaning extraction, and causal discovery model.

At block 506, the method 500 may include performing, by the one or more processors 110, similarity analysis for the processed evidence data based on the one or more parameters and the contextual information.

At block 508, the method 500 may include evaluating, by the one or more processors 110, the evidence quality, the evidence sufficiency, and the evidence completeness of the processed evidence data based on the performed similarity analysis, intrinsic factors, and extrinsic inputs.

At block 510, the method 500 may include determining, by the one or more processors 110, one or more actions to be performed on the processed evidence data based on the evaluated evidence quality, the evidence sufficiency, and the evidence completeness.

At block 512, the method 500 may include performing, by the one or more processors 110, the determined one or more actions on the processed evidence data to resolve the one or more events.

The method 500 may be implemented in any suitable hardware, software, firmware, or combination thereof. The order in which the method 500 is described is not intended to be construed as a limitation, and any number of the described method blocks may be combined or otherwise performed in any order to implement the method 500 or an alternate method. Additionally, individual blocks may be deleted from the method 500 without departing from the spirit and scope of the present disclosure described herein. Furthermore, the method 500 may be implemented in any suitable hardware, software, firmware, or a combination thereof, that exists in the related art or that is later developed. The method 500 describes, without limitation, the implementation of the system 102. A person of skill in the art will understand that method 500 may be modified appropriately for implementation in various manners without departing from the scope and spirit of the disclosure.

FIG. 6 illustrates an exemplary block diagram representation of a hardware platform 600 for implementation of the disclosed system 102, according to an example embodiment of the present disclosure. For the sake of brevity, the construction, and operational features of the system 102 which are explained in detail above are not explained in detail herein. Particularly, computing machines such as but not limited to internal/external server clusters, quantum computers, desktops, laptops, smartphones, tablets, and wearables may be used to execute the system 102 or may include the structure of the hardware platform 600. As illustrated, the hardware platform 600 may include additional components not shown, and some of the components described may be removed and/or modified. For example, a computer system with multiple GPUs may be located on external-cloud platforms including Amazon Web Services, internal corporate cloud computing clusters, or organizational computing resources.

The hardware platform 600 may be a computer system such as the system 102 that may be used with the embodiments described herein. The computer system may represent a computational platform that includes components that may be in a server or another computer system. The computer system may be executed by the processor 605 (e.g., single, or multiple processors) or other hardware processing circuits, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 605 that executes software instructions or code stored on a non-transitory computer-readable storage medium 610 to perform methods of the present disclosure. The software code includes, for example, instructions to gather data and analyze the data. For example, the plurality of modules 114 includes a data obtaining module 206, a data processing module 208, an analysis performing module 210, an evidence evaluating module 212, an action determining module 214, and an action performing module 216.

The instructions on the computer-readable storage medium 610 are read and stored the instructions in storage 615 or random-access memory (RAM). The storage 615 may provide a space for keeping static data where at least some instructions could be stored for later execution. The stored instructions may be further compiled to generate other representations of the instructions and dynamically stored in the RAM such as RAM 620. The processor 605 may read instructions from the RAM 620 and perform actions as instructed.

The computer system may further include the output device 625 to provide at least some of the results of the execution as output including, but not limited to, visual information to users, such as external agents. The output device 625 may include a display on computing devices and virtual reality glasses. For example, the display may be a mobile phone screen or a laptop screen. GUIs and/or text may be presented as an output on the display screen. The computer system may further include an input device 630 to provide a user or another device with mechanisms for entering data and/or otherwise interacting with the computer system. The input device 630 may include, for example, a keyboard, a keypad, a mouse, or a touchscreen. Each of these output devices 625 and input device 630 may be joined by one or more additional peripherals. For example, the output device 625 may be used to display the results such as bot responses by the executable chatbot.

A network communicator 635 may be provided to connect the computer system to a network and in turn to other devices connected to the network including other clients, servers, data stores, and interfaces, for example. A network communicator 635 may include, for example, a network adapter such as a LAN adapter or a wireless adapter. The computer system may include a data sources interface 640 to access the data source 645. The data source 645 may be an information resource. As an example, a database of exceptions and rules may be provided as the data source 645. Moreover, knowledge repositories and curated data may be other examples of the data source 645.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

A description of an embodiment with several components in communication with each other does not imply that all such components are required. On the contrary, a variety of optional components are described to illustrate the wide variety of possible embodiments of the present disclosure. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices that are not explicitly described as having such functionality/features. Thus, other embodiments of the present disclosure need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the present disclosure be limited not by this detailed description, but rather by any claims issued in an application based here on. Accordingly, the embodiments of the present disclosure are intended to be illustrative, but not limited, of the scope of the disclosure, which is outlined in the following claims.

We claim:

1. A computer-implemented system for collaborative smart evidence gathering and investigation for incident response, attack surface management, and forensics in a computing environment, the computer-implemented system comprising:

one or more processors;

a memory coupled to the one or more processors, wherein the memory comprises a plurality of modules in form of programmable instructions executable by the one or more processors, and wherein the plurality of modules comprises:

a data obtaining module configured to obtain evidence data corresponding to one or more events from multiple data sources, multimodal and multi-context entries, and initiation points, wherein the evidence data comprises one or more parameters and contextual information;

a data processing module configured to process the obtained evidence data into one or more investigation categories based on the one or more parameters and the contextual information using an artificial intelligence (AI) root cause analysis, graph augmented retrieval, semantic classifier, meaning extraction, and causal discovery model;

an analysis performing module configured to perform similarity analysis for the processed evidence data based on the one or more parameters and the contextual information;

an evidence evaluating module configured to evaluate an evidence quality, an evidence sufficiency, and an evidence completeness of the processed evidence data based on the performed similarity analysis, intrinsic factors, and extrinsic inputs;

an action determining module configured to determine one or more actions to be performed on the processed evidence data based on the evaluated evidence quality, the evidence sufficiency, and the evidence completeness, wherein to determine the one or more actions to be performed on the processed evidence data based on the evaluated evidence quality, the evidence sufficiency, and the evidence completeness, the plurality of modules further comprises:

an evidence inferring module configured to infer additional evidence required to be gathered as a support to the obtained evidence data based on the evaluated evidence quality, the evidence sufficiency, and the evidence completeness;

an evidence obtaining module configured to obtain the inferred additional evidence by defining search parameters corresponding to the inferred additional evidence;

an evidence simulating module configured to simulate the obtained additional evidence to determine the evidence quality, the evidence sufficiency, and the evidence completeness of the additional evidence;

a pathway determining module configured to determine exploitation pathway for the additional evidence using generative and adversarial AI models;

a missing data determining module configured to determine missing data in the additional evidence based on the determined exploitation pathway, determined evidence quality, the evidence sufficiency, and the evidence completeness of the additional evidence; and an evidence refining data module configured to refine the additional evidence to recreate the determined missing data; and an action performing module configured to perform the determined one or more actions on the processed evidence data to resolve the one or more events.

2. The computer-implemented system of claim 1, wherein for determining one or more actions to be performed on the processed evidence data based on the evaluated evidence quality, the evidence sufficiency, and the evidence completeness, the plurality of modules further comprises:

a data storing module configured to store the processed evidence data into at least one of a bookmark library, collectible library, and a historical evidence library; and a data assigning module configured to assign the processed evidence data to at least one of an existing case and a new case based on manifestation of the evidence data.

3. The computer-implemented system of claim 1, wherein for determining one or more actions to be performed on the processed evidence data based on the evaluated evidence quality, the evidence sufficiency, and the evidence completeness, the plurality of modules further comprises:

an evidence type determining module configured to determine a type of required additional evidence to support investigation based on the evaluated evidence quality, the evidence sufficiency, and the evidence completeness.

4. The computer-implemented system of claim 1, wherein for determining one or more actions to be performed on the processed evidence data based on the evaluated evidence quality, the evidence sufficiency, and the evidence completeness, the plurality of modules further comprises:

a replay determining module configured to determine the evidence to replay;

a data retrieving module configured to retrieve dataset and visual representation information associated with the determined evidence;

a preview generating module configured to generate an embedded preview of the determined evidence for replaying the determined evidence; and a state assessing module configured to assess state of the determined evidence before, during and after a context when the determined evidence originally appeared.

5. The computer-implemented system of claim 1, wherein for determining one or more actions to be performed on the processed evidence data based on the evaluated evidence quality, the evidence sufficiency and the evidence completeness, the plurality of modules further comprises:

a root cause determining module configured to determine possible root causes for the additional evidence;

a weight assigning module configured to assign likelihood weights to each of the determined possible root causes; and a state determining module configured to determine state of investigation of the one or more events based on the assigned likelihood weights.

6. The computer-implemented system of claim 1, wherein for determining one or more actions to be performed on the processed evidence data based on the evaluated evidence quality, the evidence sufficiency and the evidence completeness, the plurality of modules further comprises:

a query triggering module configured to trigger additional questions and queries associated with the obtained evidence data for improving evidence quality.

7. The computer-implemented system of claim 1, wherein the plurality of modules further comprises:

a participation enabling module configured to enable participation of a computer generated smart expert system as a member of evidence gathering and investigation team;

a decision generating module configured to generate collective decisions on the one or more events based on decisions collected from the computer generated smart expert system;

a workflow communication enabling module configured to enable threaded conversation and workflow centric resolution between the computer generated smart expert system to resolve the one or more events; and a first class investigator configured to manage investigation process state over time to time for the one or more events.

8. The computer-implemented system of claim 1, wherein the one or more events correspond to at least one of security and operational incidents, proactive attack surface management, and post facto forensics.

9. The computer-implemented system of claim 1, wherein the plurality of modules further comprises:

an evidence managing module configured to perform at least one of evidence ordering, sorting, stitching, and weighting for determination of attack paths, attack vectors, indicators of compromise, vulnerability impact, exploitable entry points, and security centric blast radius and impact zone calculations.

10. A computer-implemented method for collaborative smart evidence gathering and investigation for incident response, attack surface management, and forensics in a computing environment, the computer-implemented method comprising:

obtaining, by one or more processors, evidence data corresponding to one or more events from multiple data sources, multimodal and multi-context entries, and initiation points, wherein the evidence data comprises one or more parameters and contextual information, and wherein the one or more events correspond to at least one of security and operational incidents, proactive attack surface management, and post facto forensics;

processing, by the one or more processors, the obtained evidence data into one or more investigation categories based on the one or more parameters and contextual information using an artificial intelligence (AI) root cause analysis, graph augmented retrieval, semantic classifier, meaning extraction, and causal discovery model;

performing, by the one or more processors, similarity analysis for the processed evidence data based on the one or more parameters and the contextual information;

evaluating, by the one or more processors, an evidence quality, an evidence sufficiency, and an evidence completeness of the processed evidence data based on the performed similarity analysis, intrinsic factors, and extrinsic inputs;

determining, by the one or more processors, one or more actions to be performed on the processed evidence data based on the evaluated evidence quality, the evidence sufficiency, and the evidence completeness, wherein determining one or more actions to be performed on the processed evidence data based on the evaluated evidence quality, the evidence sufficiency, and the evidence completeness, further comprises:

inferring, by the one or more processors, additional evidence required to be gathered as a support to the obtained evidence data based on the evaluated evidence quality, the evidence sufficiency, and the evidence completeness;

defining, by the one or more processors, search parameters corresponding to the inferred additional evidence;

simulating, by the one or more processors, the obtained additional evidence to determine the evidence quality, the evidence sufficiency, and the evidence completeness of the additional evidence;

determining, by the one or more processors, exploitation pathway for the additional evidence using generative and adversarial AI models;

determining, by the one or more processors, missing data in the additional evidence based on the determined exploitation pathway, determined evidence quality, the evidence sufficiency, and the evidence completeness of the additional evidence; and refining, by the one or more processors, the additional evidence to recreate the determined missing data; and performing, by the one or more processors, the determined one or more actions on the processed evidence data to resolve the one or more events.

11. The computer-implemented method of claim 10, wherein determining one or more actions to be performed on the processed evidence data based on the evaluated evidence quality, the evidence sufficiency, and the evidence completeness, further comprises:

storing, by the one or more processors, the processed evidence data into at least one of a bookmark library, collectible library, and a historical evidence library; and assigning, by the one or more processors, the processed evidence data to at least one of an existing case and a new case based on manifestation of the evidence data.

12. The computer-implemented method of claim 10, wherein determining one or more actions to be performed on the processed evidence data based on the evaluated evidence quality, the evidence sufficiency, and the evidence completeness, further comprises:

determining, by the one or more processors, type of required additional evidence to support investigation based on the evaluated evidence quality, the evidence sufficiency, and the evidence completeness.

13. The computer-implemented method of claim 10, wherein determining one or more actions to be performed on the processed evidence data based on the evaluated evidence quality, the evidence sufficiency, and the evidence completeness, further comprises:

determining, by the one or more processors, the evidence to replay;

retrieving, by the one or more processors, dataset and visual representation information associated with the determined evidence;

generating, by the one or more processors, an embedded preview of the determined evidence for replaying the determined evidence; and assessing, by the one or more processors, state of the determined evidence before, during and after a context when the determined evidence originally appeared.

14. The computer-implemented method of claim 10, wherein determining one or more actions to be performed on the processed evidence data based on the evaluated evidence quality, the evidence sufficiency, and the evidence completeness, further comprises:

determining, by the one or more processors, possible root causes for the additional evidence;

assigning, by the one or more processors, likelihood weights to each of the determined possible root causes; and determining, by the one or more processors, state of investigation of the one or more events based on the assigned likelihood weights.

15. The computer-implemented method of claim 10, wherein determining one or more actions to be performed on the processed evidence data based on the evaluated evidence quality, the evidence sufficiency, and the evidence completeness, further comprises:

triggering, by the one or more processors, additional questions and queries associated with the obtained evidence data for improving evidence quality.

16. The computer-implemented method of claim 10, further comprising:

enabling by the one or more processors, participation of a computer generated smart expert system as a member of evidence gathering and investigation team;

generating, by the one or more processors, collective decisions on the one or more events based on decisions collected from the computer generated smart expert system;

enabling, by the one or more processors, threaded conversation and workflow centric resolution between the computer generated smart expert system to resolve the one or more events; and managing, by the one or more processors, investigation process state over time to time for the one or more events.

17. The computer-implemented method of claim 10, further comprising:

performing, by the one or more processors, at least one of evidence ordering, sorting, stitching, and weighting for determination of attack paths, attack vectors, indicators of compromise, vulnerability impact, exploitable entry points, and security centric blast radius and impact zone calculations.

18. A non-transitory computer-readable storage medium having instructions stored therein that, when executed by one or more processors, cause the one or more processors to:

obtain evidence data corresponding to one or more events from multiple data sources, multimodal and multicontext entries, and initiation points, wherein the evidence data comprises one or more parameters and contextual information;

process the obtained evidence data into one or more investigation categories based on the one or more parameters and contextual information using an artificial intelligence (AI) root cause analysis, graph augmented retrieval, semantic classifier, meaning extraction, and causal discovery model;

perform similarity analysis for the processed evidence data based on the one or more parameters and the contextual information;

evaluate an evidence quality, an evidence sufficiency, and an evidence completeness of the processed evidence data based on the performed similarity analysis, intrinsic factors, and extrinsic inputs;

determine one or more actions to be performed on the processed evidence data based on the evaluated evidence quality, the evidence sufficiency, and the evidence completeness, wherein to determine one or more actions to be performed on the processed evidence data based on the evaluated evidence quality, the evidence sufficiency, and the evidence completeness, the one or more processors is to:

infer additional evidence required to be gathered as a support to the obtained evidence data based on the evaluated evidence quality, the evidence sufficiency, and the evidence completeness;

define search parameters corresponding to the inferred additional evidence;

simulate the obtained additional evidence to determine the evidence quality, the evidence sufficiency, and the evidence completeness of the additional evidence;

determine exploitation pathway for the additional evidence using generative and adversarial AI models;

determine missing data in the additional evidence based on the determined exploitation pathway, determined evidence quality, the evidence sufficiency, and the evidence completeness of the additional evidence; and refine the additional evidence to recreate the determined missing data; and perform the determined one or more actions on the processed evidence data to resolve the one or more events.

* * * * *